April 28, 1959     D. G. FAWKES     2,884,224
SHAFT SEAL FOR A VALVE
Filed July 25, 1955     3 Sheets—Sheet 1
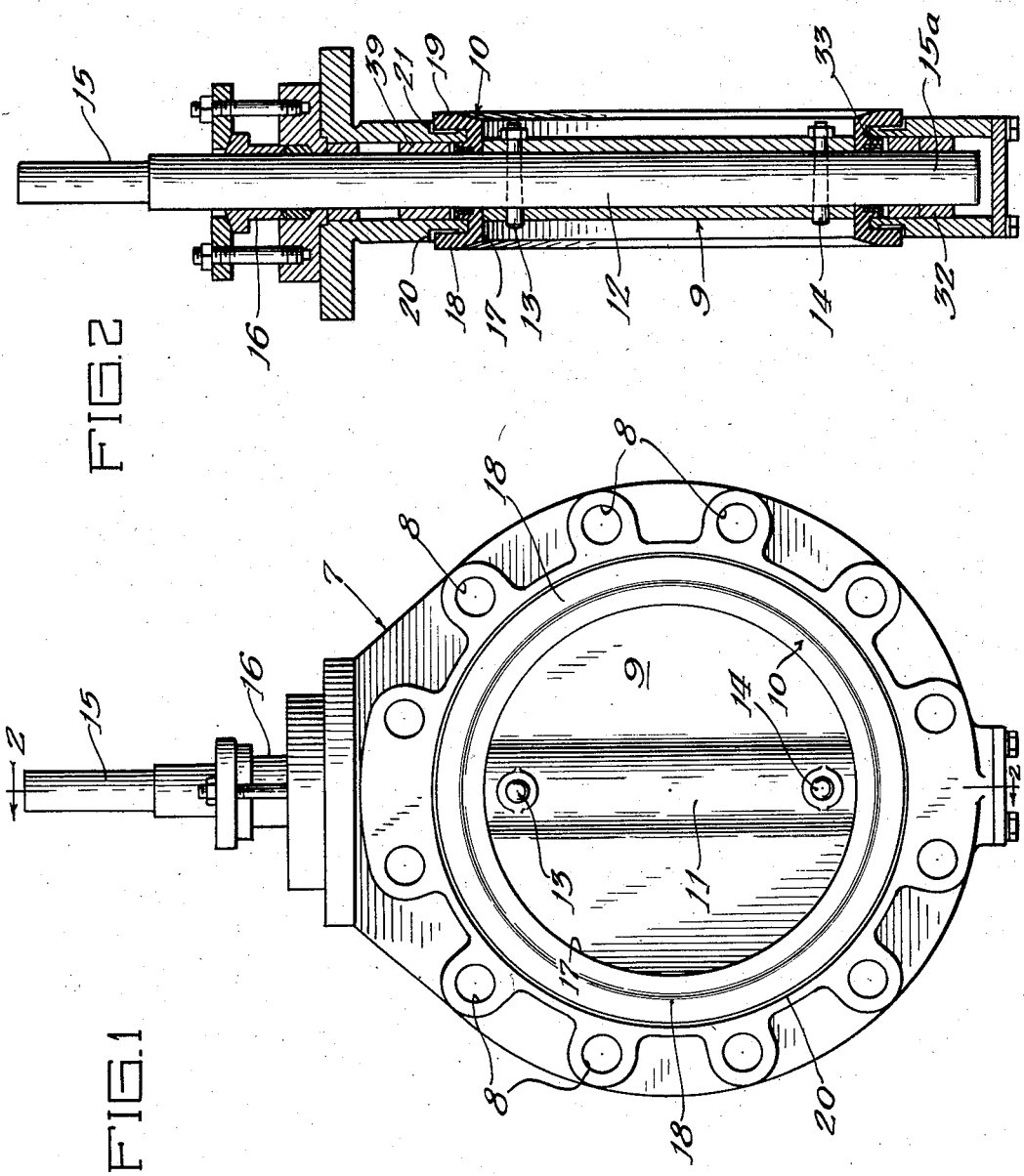
Inventor:
Donald G. Fawkes
By: Schroeder, Hofgren,
Brady & Wegner
Attorneys April 28, 1959     D. G. FAWKES     2,884,224
SHAFT SEAL FOR A VALVE Filed July 25, 1955     3 Sheets-Sheet 2

Inventor:
Donald G. Fawkes
By: Schroeder, Hofgren,
Brady & Wegner
Attorneys

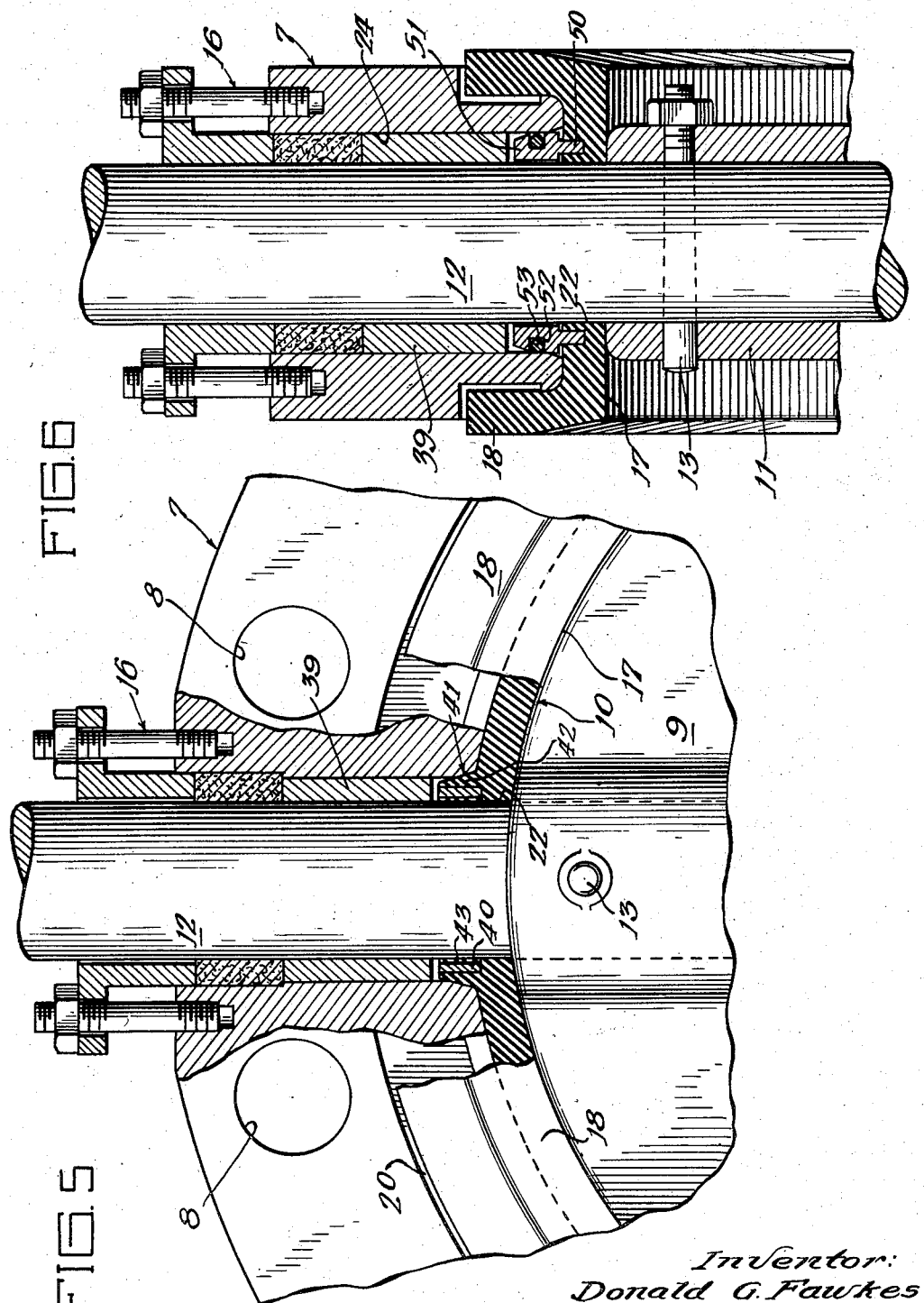

United States Patent Office 2,884,224
Patented Apr. 28, 1959

2,884,224

SHAFT SEAL FOR A VALVE

Donald G. Fawkes, Chicago, Ill., assignor to Henry Pratt Company, a corporation of Illinois Application July 25, 1955, Serial No. 524,235

8 Claims. (Cl. 251—306)

This invention is concerned with a seal for the shaft of a valve having a seat of resilient material.

It has been found that the use of a resilient seat such as one made of rubber has advantages in many valve constructions. For instance, the use of a rubber seat for butterfly valves in water service has been particularly advantageous since the valves can be made to close quite tightly and to hold higher pressures without leakage than has been the experience with valves made with metal seats. Repeated opening and closing of the valve does not seem to place undue wear upon the rubber seat of the valve, however, should such wear occur, the rubber seat of the valve may be easily replaced. There has been one particular difficulty in some valve structures of this type in that fluid would seep into the space between the rubber seat and valve housing and bulge the seat outwardly around the valve disk so that the valve could not thereafter be opened with the normal amount of force applied to the control shaft. The present invention provides a structure to obviate this difficulty.

It is an object of the present invention to provide a new and improved seal for the shaft of a valve having a valve seat of resilient material.

Another object is to provide a shaft seal for a valve which will outlast the seat itself in length of service.

Another object is to provide a shaft seal of the character described which is not affected by the frequency of opening and closing the valve.

A further object of the invention is to provide a shaft seal for a butterfly valve having a rubber seat, which seal effectively prevents the application of fluid pressures to the outside of the seat so that the seat will remain in position and not be bulged outwardly about the valve disk.

Other objects, features and advantages of the present invention will be apparent from the following description of preferred embodiments thereof illustrated in the accompanying drawings, in which:

Figure 1 is a front elevational view of a butterfly valve shown in closed position and embodying the invention herein;

Figure 2 is a vertical sectional view through the valve of Figure 1 taken substantially along line 2—2 in Figure 1;

Figure 5 is a fragmentary sectional view through a portion of the valve adjacent the control shaft and seat juncture illustrating another embodiment of the invention; and Figure 6 is a view similar to Figures 3 and 4 illustrating a further embodiment of the invention.

Figure 3:
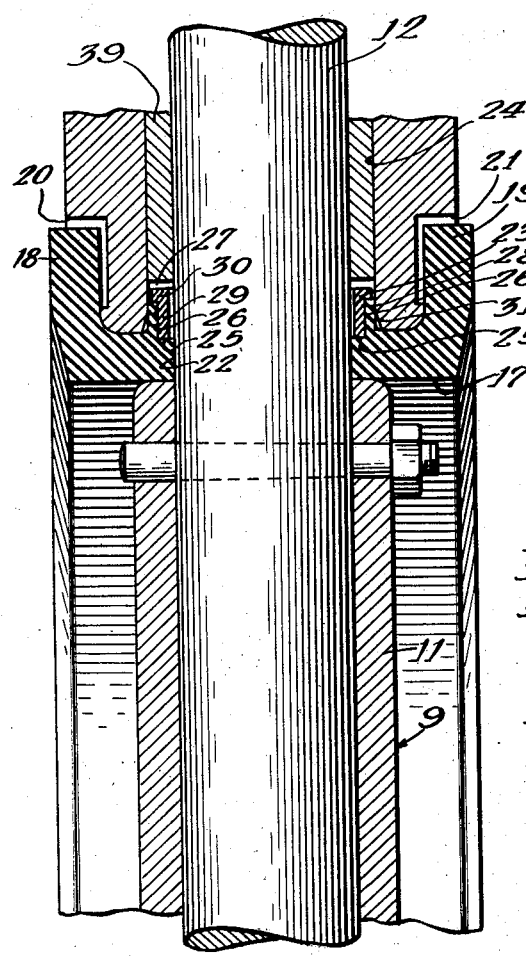
Figure 3 is a fragmentary enlarged sectional view through the seat and adjacent valve parts illustrated in Figure 2.

The application of the present invention to butterfly valves may be successfully made for valves intended for water service in size ranges from 4" to 20" nominal pipe size. A typical butterfly valve of this type is illustrated in Figure 1. The housing 7 of the valve is generally a casting intended for placement in a pipeline, the particular valve illustrated being provided with longitudinal bores 8 arranged with their centers arranged on a circle so as to match mating flanges of adjacent pipes. A valve disk 9 is shown in Figure 1 as seated against a rubber valve seat 10 defining the opening through the valve. The disk is ordinarily made of metal with a cylindrical center portion 11 for receiving the disk control shaft 12 to which the disk is attached by pins 13 and 14. The control shaft has an upper portion 15 extending out of the valve housing for the purpose of receiving either manual or mechanical operating structures for turning the shaft and disk. The usual form of packing 16 is provided to seal the shaft in the housing of the valve.

The particular form of rubber valve seat 10 chosen for illustrating the invention is an annular ring of rubber having a smooth cylindrical inner surface 17 against which the disk 9 is intended to seat. The rubber seat is provided with integral marginal flanges 18 and 19 intended to be forced by the mating flanges of adjacent pipe into annular grooves 20 and 21 for the purpose of sealing against the valve housing. These flanges thus form a barrier against the passage of fluid from the pipeline into the underside of the rubber seat. This particular form of sealing the rubber seat in the valve housing has been particularly effective and also makes replacement of the seat in the valve quite easy as the flanges also serve to align and mount the rubber seat in place.

In the past, difficulty has been encountered with valve liners of resilient material such as the rubber valve seat described above because the fluid pressure on a closed valve would seep along the control shaft and find its way back of the rubber valve seat on the downstream side. As the pressure built up behind the seat, the rubber would distend under the influence of the pressure and form an appreciable ridge on the downstream side of the valve disk. Since there was no pressure on the downstream side of the valve to oppose the bulging out of the rubber seat, this condition made it quite difficult to open the valve thereafter. The present invention effectively avoids any passage of fluid from the pressure side of the valve to the back side of the rubber seat so that the bulging out of the seat is consequently avoided.

Referring particularly to Figure 3, which is an enlargement of the structure shown in Figure 2, an opening 22 is provided in the rubber seat for the passage of the control shaft 12 through the seat. It is through this opening 22 that leakage has previously occurred so that pressure was applied to the underside of the seat to bulge it toward the valve disk. In the present invention, any application of pressure to the underside of the seat is avoided by providing a static seal around the control shaft as contrasted to previous attempts to seal the valve seat against the shaft.

In Figure 3, a rigid metal compression ring 23 is vulcanized into the rubber of the valve seat in a position extending around the control shaft where the shaft passes through an opening 24 provided for that purpose in the valve housing. In this embodiment, the ring is sealed by bonding or vulcanizing or other means along the surfaces 25 and 26 so that liquid that does pass upwardly along the shaft cannot pass along the outer side of the compression ring. As constructed, fluid under pressure may pass along the control shaft into the annular space 27 above the compression ring. Pressure in this space can cause no harm to the rubber valve seat since further passage of the fluid to the underneath side of the valve seat is effectively blocked by a static seal formed by an annular neck-like portion 28 of rubber on the outside of the ring. This neck-like ring 28 is formed integrally with the rubber valve seat and of a width that mere insertion of the compression ring and ring 28 of rubber into the bore 24 in the housing will compress the ring of rubber 28 between the compression ring and the adjacent portion of the housing. Thus, an effective static seal is provided which blocks passage of the fluid to the space between the rubber seat and the valve housing. No matter how much the valve is opened and closed, the static seal will not be at all affected since it remains in its original position without being changed by turning of the shaft on the interior of the compression ring.

The particular form of compression ring shown in Figures 2 and 3 has an annular cylindrical skirt portion 29 with a short outwardly extending flange 30 at a right angle to the skirt portion 29. The particular form of ring is easy to handle and set into the mold for the rubber seat and also provides in some measure, a means of retaining the ring 28 of rubber in proper location for performing its sealing function. The outwardly extending flange 30 also keeps the rubber ring 28 from extruding longitudinally of the control shaft 12 when it is forced into the bore 24 past the slightly sloping outer portion 31 of the bore. The ring 28 is actually compressed between the compression ring 23 and the sidewalls of the bore 24.

It will be understood that the detailed description of the static seal described above is applicable to both ends of the valve control shaft 12. The lower end 15a of the shaft is housed in suitable bearings 32 and a similar shaft seal, generally indicated 33, is provided at the point where the shaft passes through the rubber seat. As molded, the seat is provided with diametrically opposite openings to receive the control shaft of the valve.

Figure 4:
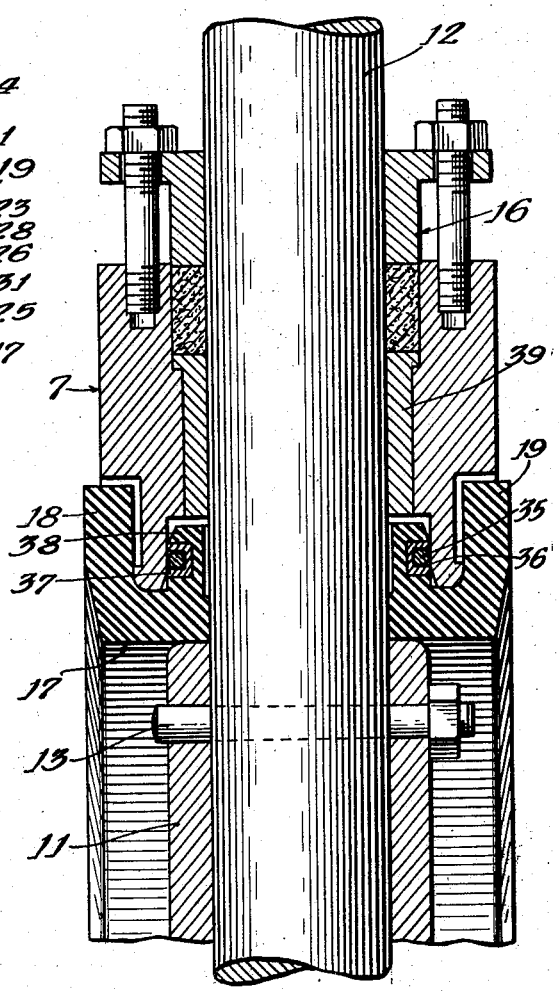
Figure 4 is a view similar to Figure 3 showing another embodiment of the invention.

Referring particularly to Figure 4 of the drawings, a further embodiment of the invention is illustrated wherein the static seal is provided by an O-ring 35 held in place by a recess 36 formed within a compression ring 37 generally U-shaped in section. This compression ring is molded into the rubber neck-like portion 38 formed integrally with the valve seat. In this instance, only the rubber of the valve seat is adjacent the shaft so that there can be absolutely no passage of liquid directly from the shaft opening of the seat past the compression ring. The O-ring forms the static seal by being compressed between the compression ring 37 and the wall of recess 36 as shown. The packing 16 for the control shaft 12 as well as bearings 39 for the control shaft are all the same as illustrated in Figures 1 to 3. Only the form of the static seal about the control shaft is different from that illustrated in Figure 3.

A further embodiment is illustrated in Figure 5 wherein the compression ring is a straight circular cylindrical ring 40 molded in a neck-like portion 41 of the rubber valve seat 10. A tapered integral rubber portion 42 extends upwardly on the outside of the compression ring for the purpose of forming the static seal against the valve housing. The rubber portion 42 is compressed between the compression ring and valve housing as shown, to form the static seal. In this form the compression ring may be entirely embedded in the rubber and a narrow portion 43 of the rubber may extend up around the control shaft on the inner side of the compression ring.

A still further embodiment, illustrated in Figure 6, dispenses with the necessity of having a neck-like portion of rubber molded into the ring about the shaft opening 22. The static seal is entirely supported by the metal compression ring which has a lower skirt portion 50 formed integrally with the upper body portion 51 which is also cylindrical in its inner surface to fit fairly closely around the control shaft 12. The outer part of the upper body portion is formed with a peripheral groove 52 receiving O-ring 53 sealing against the bore 24 in the housing through which the shaft passes. The O-ring is compressed between the compression ring and the wall of bore 24 to provide the seal. Any leakage of fluid past the rubber valve seat and along the shaft 12 would effectively be stopped at the O-ring 53. No leakage can pass between the compression ring and the valve seat since skirt 50 is secured in the rubber of the seat in a fluid-tight manner.

In each of the embodiments illustrated, the shaft seal is independent of the turning of the shaft, that is to say, the seal is not disturbed by opening and closing of the valve. The rubber seat supports the shaft seal independently of the control shaft 12 since the compression ring provided for the purpose of backing resilient material and forming the seal itself is carried by the replaceable valve seat of the liner. The essential features of the seal are to so connect the compression ring and valve seat material that fluid can only pass, if at all, over the static seal itself. Ordinarily, very little difficulty is encountered in making the static seal fluid-tight. In the present instance, the static seals have proved quite satisfactory in valves operated under vacuums to valves operating up to 150 p.s.i.g.

The foregoing detailed description has been given for clearness of understanding only, and no unnecessary limitations should be understood therefrom, for some modifications will be obvious to those skilled in the art.

I claim:

1. A valve seat assembly for a valve, comprising: a valve body, an annular rubber seat liner having an inner surface forming a seat for a valve disk and a pair of diametrically opposite openings for passage of a disk control shaft through the liner; peripheral flanges formed on said seat liner for sealing engagement with the valve body preventing application of fluid pressure to the outer side of the liner between the liner and valve body; a rigid metallic compression ring molded in fluid-tight relation to the rubber liner about each shaft opening; and a resilient static seal compressed between the compression ring and valve body and extending about the compression ring for sealing engagement with the valve body to prevent passage of fluid to the outer side of the liner after such fluid has passed along the shaft opening from the interior of the valve.

2. A valve seat assembly for a valve, comprising: a valve body, an annular valve seat of resilient material and a valve closure control shaft passing through the valve seat material, a compression ring secured to the seat material in fluid tight relation, with the shaft passing into the interior of the valve through the compression ring and a ring of resilient material contacting the outer periphery of the compression ring and compressed between the valve body and said compression ring to provide a static seal against passage of fluid which has passed along the shaft from passing to a position between the seat and valve body.

3. A shaft seal as specified in claim 2 wherein said ring of resilient material is a cylindrical portion formed integrally with the seat material and extending outwardly around the compression ring in position to be compressed between the valve body and compression ring to form said seal.

4. A shaft seal as specified in claim 2 wherein the compression ring is provided with an outer peripheral recess and said ring of resilient material is an O-ring seal seated in the recess for sealing engagement with the compression ring and valve body.

5. A valve seat assembly for a valve, comprising: a valve body having a valve disk and a control shaft; an annular valve seat in the body having a generally cylindrical rubber seat portion provided with an outer surface and an inner surface for sealing engagement with the periphery of said valve disk, said seat portion having a pair of opposite openings for passage of the control shaft radially through the seat portion; a rigid compression ring bonded to the rubber seat portion in axial alignment with each opening and extending outwardly from the outer surface of said seat portion so as to extend around the control shaft; and a resilient sealing ring bearing inwardly against the compression ring in sealing engagement therewith and outwardly against a portion of the valve body in sealing engagement therewith, said sealing ring forming a static seal to prevent fluid which has passed along the shaft from entering the outer side of the rubber seat portion.

6. A shaft seal as specified in claim 5 wherein said resilient sealing ring comprises a cylindrical rubber neck portion integrally formed with the rubber seat portion about each shaft opening and the compression ring is molded in the inner part of said neck portion with the outer part of the neck portion forming said static seal.

7. A shaft seal as specified in claim 5 wherein the compression ring has a cylindrical skirt portion bonded to the rubber seat and an adjacent body portion formed with an outer recess and said sealing ring comprises a resilient O-ring seated in the recess for sealing engagement with a portion of the valve body.

8. A shaft seal as specified in claim 5 wherein a cylindrical rubber neck portion is integrally formed with the rubber seat portion about each shaft opening, said compression ring is formed with an outwardly open recess and molded into the outer part of said neck portion, and said sealing ring is an O-ring mounted in said recess to form said static seal.

References Cited in the file of this patent

UNITED STATES PATENTS 2,054,369     Francis _____ Sept. 15, 1936

FOREIGN PATENTS 670,327     Germany _____ of 1939